United States Patent [19]
Appeldorn et al.

[11] Patent Number: 5,631,994
[45] Date of Patent: May 20, 1997

[54] STRUCTURED SURFACE LIGHT EXTRACTION OVERLAY AND ILLUMINATION SYSTEM

[75] Inventors: Roger H. Appeldorn, White Bear Lake; David J. Lundin, Woodbury, both of Minn.

[73] Assignee: Minnesota Mining and Manufacturing Company, St. Paul, Minn.

[21] Appl. No.: 518,337

[22] Filed: Aug. 23, 1995

[51] Int. Cl.$^6$ .................. G02B 6/00; F21V 7/04
[52] U.S. Cl. ............... 385/147; 385/31; 385/36; 385/37; 385/131; 385/123; 362/32
[58] Field of Search ............... 385/31, 37, 130, 385/132, 123, 127, 128, 147, 131, 901, 36; 362/32

[56] References Cited

U.S. PATENT DOCUMENTS

| | | | |
|---|---|---|---|
| 4,052,120 | 10/1977 | Sick et al. | 385/147 X |
| 4,059,916 | 11/1977 | Tachibom | 40/130 |
| 4,171,844 | 10/1979 | Landaal et al. | 296/57 R |
| 4,173,390 | 11/1979 | Kach | 385/147 X |
| 4,234,907 | 11/1980 | Daniel | 362/32 |
| 4,242,723 | 12/1980 | Fabbri et al. | 362/33 |
| 4,285,889 | 8/1981 | Parsons | 264/2.6 |
| 4,307,932 | 12/1981 | Winzer | 385/49 X |
| 4,422,719 | 12/1983 | Orcutt | 385/901 X |
| 4,447,118 | 5/1984 | Mulkey | 250/227.11 X |
| 4,460,940 | 7/1984 | Mori | 362/32 |
| 4,466,697 | 8/1984 | Daniel | 385/147 X |
| 4,471,412 | 9/1984 | Mori | 362/32 |
| 4,519,017 | 5/1985 | Daniel | 362/32 |
| 4,575,180 | 3/1986 | Chang | 385/147 X |
| 4,576,436 | 3/1986 | Daniel | 385/147 X |
| 4,583,818 | 4/1986 | Chen et al. | 385/37 X |
| 4,642,736 | 2/1987 | Masuzawa et al. | 362/31 |
| 4,648,690 | 3/1987 | Ohe | 385/901 X |
| 4,690,490 | 9/1987 | Mori | 385/901 X |
| 4,691,982 | 9/1987 | Nishimura et al. | 385/37 X |
| 4,729,068 | 3/1988 | Ohe | 362/31 |
| 4,743,410 | 5/1988 | Grethen et al. | 264/1.4 |
| 4,765,701 | 8/1988 | Cheslak | 385/901 X |
| 4,822,123 | 4/1989 | Mori | 385/147 X |
| 4,845,596 | 7/1989 | Mouissie | 362/32 |

(List continued on next page.)

FOREIGN PATENT DOCUMENTS

| | | | |
|---|---|---|---|
| 2626381 | 1/1991 | France | 385/147 X |
| 53-29740 | 3/1978 | Japan | G02B 5/14 |
| 62-9205 | 1/1987 | Japan | G02B 6/00 |
| 62-9206 | 1/1987 | Japan | G02B 6/00 |
| 62-86307 | 4/1987 | Japan | 385/37 X |
| 63-121002 | 5/1988 | Japan | G02B 6/00 |
| 762769 | 12/1956 | United Kingdom . | |
| 95/34009 | 12/1995 | WIPO | G02B 6/00 |

*Primary Examiner*—Brian Healy
*Attorney, Agent, or Firm*—Gary L. Griswold; Walter N. Kirn; Stephen W. Buckingham

[57] ABSTRACT

A light extraction overlay for extracting light from a desired location on a light guide includes a substantially optically transparent substrate which has a base surface and a structured surface opposite the base surface. The structured surface includes optical elements which have optically smooth surfaces disposed at an angle relative to the base surface. Preferably, the optical elements are coated with a specularly reflective material. The optical elements may be separated by substantially planar portions of the structured surface.

In use, the base surface is optically coupled with a portion of a surface of a light guide such that light may be transmitted from the optical fiber into the substrate. Light rays which strike a planar portion of the structured surface are reflected back into the fiber at an angle which is greater than the critical angle necessary for continued propagation in the light guide and, accordingly, continue to propagate along the optical fiber. Light rays which strike an optical element are reflected into the fiber at an angle less than the critical angle angle necessary for continued propagation in the light guide and, accordingly, are transmitted from the surface of the light guide.

15 Claims, 2 Drawing Sheets

U.S. PATENT DOCUMENTS

| | | | |
|---|---|---|---|
| 4,865,417 | 9/1989 | Naohiro et al. | 385/123 X |
| 4,885,663 | 12/1989 | Parker | 362/32 |
| 4,907,132 | 3/1990 | Parker | 362/32 |
| 4,929,169 | 5/1990 | Fujigaki et al. | 425/385 |
| 4,989,933 | 2/1991 | Duguay et al. | 385/901 X |
| 5,005,931 | 4/1991 | Mori | 385/147 X |
| 5,009,020 | 4/1991 | Watanabe | 40/547 |
| 5,027,259 | 6/1991 | Chujko | 362/32 |
| 5,037,172 | 8/1991 | Hekman et al. | 385/31 |
| 5,050,946 | 9/1991 | Hathaway et al. | 385/33 |
| 5,187,765 | 2/1993 | Muehlemann et al. | 385/115 |
| 5,226,105 | 7/1993 | Myers | 385/147 |
| 5,247,390 | 9/1993 | Hed | 359/599 |
| 5,295,208 | 3/1994 | Caulfield et al. | 385/27 |
| 5,298,327 | 3/1994 | Zarian et al. | 428/373 |
| 5,303,322 | 4/1994 | Winston et al. | 385/901 X |
| 5,359,691 | 10/1994 | Tai et al. | 385/146 |
| 5,390,276 | 2/1995 | Tai et al. | 385/146 |
| 5,432,876 | 7/1995 | Appeldorn et al. | 385/31 |
| 5,506,929 | 4/1996 | Tai et al. | 385/146 |

STRUCTURED SURFACE LIGHT EXTRACTION OVERLAY AND ILLUMINATION SYSTEM

FIELD OF THE INVENTION

The present invention relates to illumination systems. In particular, the present invention relates to an overlay having a structured surface for extracting light from a light guide and to an illumination system employing the same.

BACKGROUND

Optical fibers include a core, generally of an inorganic glass or a synthetic plastic resin, and may include a cladding material which has a lower refractive index than the core material. Light injected into an end of the optical fiber propagates through the fiber core according to the principles of total internal reflection. The efficiency of propagation through the optical fiber core is proportional to the difference between the refractive index of the optical fiber core and the refractive index of the cladding. Accordingly, the efficiency of propagation increases as the difference between the refractive index of the core and the refractive index of the cladding increases.

Optical fibers used in the communications industry typically measure between about 0.1 millimeter and 1.5 millimeter. In practice, a plurality of optical fibers may be bundled together to form a fiber optic cable. Each fiber in the cable is capable of transmitting light in an independent fashion. Accordingly, such bundling of optical fibers is considered desirable for data transmission purposes such as, for example, in the electronics and telecommunications industry.

Optical fiber may also be used as a component of an illumination device or system. Light may be injected into one end of an optical fiber and allowed to exit the fiber at a predetermined position along the fiber. Techniques for encouraging light to exit the fiber include subjecting the fiber to relatively sharp bends, generally known as microbends (U.S. Pat. Nos. 4,171,844; 4,885,663; 4,907,132; German Patent No. 3801385) and removing and/or toughening a portion of the optical fiber core or cladding to provide a diffuse surface which allows light to escape (French Pat. No. 2626381; Japanese Utility Model Registration Nos. 62-9205; 62-9206). Each of these techniques are essentially passive extraction techniques which allow light to leak from an optical fiber in an uncontrolled fashion. U.S. Pat. No. 5,432,876 ('876 Patent) is directed toward an optical fiber having a plurality of reflecting surfaces formed in the core of the optical fiber which reflect, in a radial direction, a portion of the light propagating axially through the fiber such that it exits the fiber in a radial direction. The invention described in the '876 Patent calls for a permanent alteration of the core of the optical fiber which is preferably performed during the manufacturing process.

SUMMARY OF THE INVENTION

The present invention provides an overlay for extracting light from a light guide. Preferably, an overlay in accordance with the present invention includes a substantially optically transparent substrate having a base surface and a structured surface including a plurality of optical elements opposite the base surface. At least one optical element, and preferably a majority of the optical elements, has a first optically smooth surface disposed at an angle relative to the base surface of the overlay such that, in use, a portion of the light incident on the base surface of the overlay is reflected from the optically smooth surface and exits the overlay from the base surface at an angle which is less than the angle of incidence.

A second aspect of the present invention is directed toward a light distribution system comprising a light guide for transporting light and at least one light extraction overlay including a substrate having a base surface and a structured surface opposite the base surface for extracting light from the light guide optically coupled with a portion of the surface of the light guide. In a preferred embodiment, the light guide comprises an optical fiber, and even more preferably a large diameter (e.g. >1.0 millimeters) optical fiber, for transporting light. The base surface of the light extraction overlay is optically coupled with a portion of the surface of the light guide such that light may be transmitted from the light guide into the substrate. The structured surface includes at least one optical element which has a first optically smooth surface disposed at an angle relative to the base surface such that light transmitted from the light guide into the substrate may be reflected from the optical element and extracted from a surface of the light guide at a location displaced from the overlay.

A further aspect of the present invention is directed toward an illumination system which includes a light source and a light guide optically coupled with said light source for transporting light from said light source and at least one light extraction overlay optically coupled with a portion of the surface of the light guide. In a preferred embodiment, the light guide comprises an optical fiber, and even more preferably a large diameter (e.g. >1.0 millimeters) optical fiber, for transporting light. The base surface of the light extraction overlay is optically coupled with a portion of the surface of the light guide such that light may be transmitted from the light guide into the substrate. The structured surface includes at least one optical element which has a first optically smooth surface disposed at an angle relative to the base surface such that light transmitted from the light guide into the substrate may be reflected from the optical element and extracted from a surface of the light guide at a location displaced from the overlay.

Yet another aspect of the present invention is directed toward providing a method for preparing a light guide to distribute light to predetermined regions adjacent the light guide. In accordance with the present invention, at least one desired portion of said light guide is selected from which light propagating through said light guide is to be extracted. Next, a light extraction overlay is connected to the light guide along a desired portion of said light guide such that the base surface of the light extraction overlay is optically coupled with the light transmissive portion of the light guide. Accordingly, when light is injected into the light guide, some portion of the light propagating along the light guide is extracted at the desired location.

DETAILED DESCRIPTION

Figure 1:
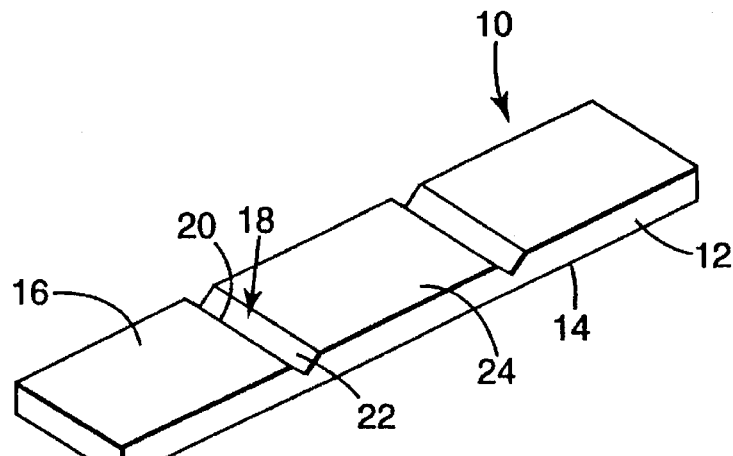
FIG. 1 is a perspective view of one embodiment of a structured surface light extraction overlay in accordance with principles of the present invention.

The present invention is directed toward a light extraction overlay which, when used in combination with a light guide, provides a highly efficient mechanism for extracting light from a desired location or locations on a light guide. An overlay in accordance with the present invention is readily adaptable to extract a desired quantity of light from a given area of a light guide. Additionally, an overlay in accordance with the present invention may easily be adapted to distribute extracted light into a desired energy pattern or distribution. While several specific embodiments of the invention are described herein, many additional variations obvious to one of ordinary skill in the optical arts are contemplated by the present invention.

One exemplary embodiment of an overlay in accordance with the present invention comprises a substantially optically transparent substrate manufactured from a suitable plastic material which preferably measures between about 0.05 millimeters and 1.5 millimeters in thickness. The substrate includes a base surface and a structured surface opposite the base surface. The base surface preferably includes an optically clear bonding mechanism for optically coupling the overlay to an optical waveguide such as, for example an optical fiber. The structured surface preferably includes a plurality of optical elements which may be separated by a substantially planar optically smooth surface. Each optical element defines a first optically smooth surface and a second surface in the substrate. Each optically smooth surface is disposed at an angle of approximately 40 to 50 degrees with the base surface, and preferably at an angle of approximately 45 degrees with the substrate. Preferably, the first and second side surfaces of the optical elements are coated with a specularly reflective substance.

As used herein, the term optically smooth surface shall refer to a surface which functions to reflect incident light specularly. In accordance with the present invention, a portion of the light reflected from the optical element is redirected into the light guide at an angle which is less than the critical angle necessary for continued propagation along the fiber according to the principles of total internal reflection. Optically smooth surfaces are to be distinguished from diffusive surfaces, which allow light to leak from an optical fiber.

In use, the base surface of the overlay is optically coupled to a light guide. A portion of the light propagating through the light guide is transmitted across the base surface of the overlay and propagates through the optically clear substrate. A first portion of the light propagating through the substrate strikes one of the optically smooth surfaces of an optical element and is reflected at an angle less than the critical angle for the light guide, thereby directing the light out of the light guide. Provided the structured surface includes an optically smooth surface which is substantially parallel to the base surface, a second portion of the light propagating through the overlay strikes this portion of the structured surface and is reflected back into the waveguide at an angle greater than the critical angle and, therefore, continues to propagate through the light guide.

Advantageously, a light distribution system comprising a combination of a light guide and at least one light extraction overlay allows for the selective extraction of light from a desired location or locations on a light guide, thereby providing improved flexibility over existing optical fiber illumination systems. Additionally, light extraction overlays in accordance with the present invention may be designed such that, when used in combination with a light guide of a preselected shape, light is extracted with a predetermined, desired energy distribution pattern.

FIG. 1 depicts a portion of one embodiment of a light extraction overlay 10 in accordance with principles of the present invention. Overlay 10 is formed from a substantially optically transparent substrate 12 and has a base surface 14 and a structured surface 16 opposite base surface 14. Structured surface 16 includes at least one, and preferably a plurality of optical elements 18 formed therein. Each optical element includes at least one optically smooth surface 20. While not necessary, optical elements 18 are preferably separated by a substantially planar portion 24 of structured surface 16.

Figure 2:
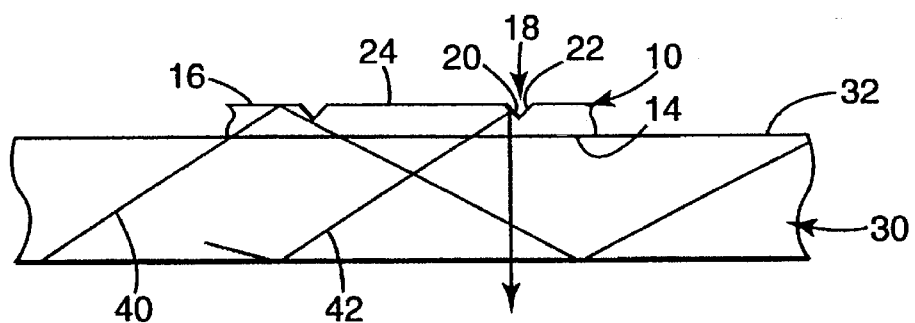
FIG. 2 is a schematic, cross-sectional view of a structured surface light extraction overlay in conjunction with a light guide illustrating the operating principles of a light extraction overlay in accordance with the present invention.

The basic principles of operation of light extractor overlay 10 may be illustrated with reference to FIG. 2. FIG. 2 presents a schematic cross-sectional view of a light extraction overlay 10 substantially as depicted in FIG. 1 in operative contact with a light guide 30. As illustrated, base surface 14 of overlay 10 is optically coupled with the surface 32 of light guide 30. In use, light ray 40 is transmitted across the interface between light guide 30 and base surface 14 of light extraction overlay 10 and strikes a substantially planar portion 24 of structured surface 16, where it is reflected back into light guide 30 at an angle greater than the critical angle of light guide 30 and accordingly, continues to propagate along light guide 30. By contrast, light ray 42 is transmitted across the interface between light guide 30 and base surface 14 of light extraction overlay 10 and strikes an optically smooth surface 20 of optical element 18 which is disposed at an angle relative to the plane of base surface 14. Accordingly, light ray 42 is reflected from optically smooth surface 20 into light guide 30 and strikes a surface of light guide 30 at an angle which is less than the critical angle necessary for continued propagation along light guide 30, thereby allowing light ray 42 to be transmitted from the surface of light guide 30. Preferably, optically smooth surface 20 is coated with a specularly reflective material such as, for example, aluminum or silver.

It will be appreciated by one of ordinary skill in the optical arts that the characteristics (e.g. length, width, thickness, shape and size of optical elements, etc.) of overlay 10 may vary widely depending upon the requirements of the particular application. For example, the shape, the cross-sectional area, and the angle of inclination (relative to the base surface) of each optically smooth surface will influence the amount of light extracted from the fiber. Consequently, the amount and direction of light reflected from the fiber can be controlled by selecting the appropriate geometry for optical elements 18, as well as the pattern and spacing of the optical elements 18. Additionally, it will be appreciated by one of ordinary skill in the optical arts that the optical properties of overlay 10 may be combined with the optical properties of a light guide to yield an optical system with desired properties. For example, an overlay in accordance with the present invention may take advantage of the optical power provided by the curved surface of an optical fiber to focus extracted light into a desired energy distribution.

In the embodiment depicted in FIG. 2, optically smooth surface 20 of optical element 18 is inclined at an angle of approximately 45 degrees relative to base surface 14, although it will be appreciated that angles from 10 degrees to 80 degrees, preferably from 20 degrees to 70 degrees, and more preferably from 30 degrees to 60 degrees are also useful depending upon the desired amount and direction of travel of light exiting the light guide. However, any useful angle between 0 degrees and 90 degrees may be used.

Optical element 18 may also have a second optically smooth surface 22 for reflecting light propagating through light guide 30 in a direction opposite that illustrated by light rays 40, 42. Second optically smooth surface 22 depicted in FIG. 2 is also inclined at an angle of approximately 45 degrees relative to the plane of base surface 14, however, it will be appreciated that second optically smooth surface 22 may be inclined at any useful angle angle measuring between 0 and 90 degrees. It will also be appreciated that an optical element may have more than two optically smooth surfaces. For example, optical element 18 could include a trihedral or a hemispherical depression in structured surface 16. Additionally, it will be appreciated that structured surface 16 could include optical elements which protrude from the plane of the structured surface.

Light which is incident on optically smooth surfaces 20 and 22 at an angle less than the critical angle will be transmitted through optically smooth surfaces 20 and 22. One of ordinary skill in the optical arts will recognize that if optically smooth surfaces 20 and 22 are not coated with a specularly reflected substance, then light which is transmitted through these surfaces will be refracted from overlay 10 in a highly directional manner. Empirical testing using a large diameter optical fiber as a light guide has indicated that light which is refracted from optical surfaces such as 20 and 22 is transmitted from the fiber in an exit cone with an angular spread measuring between 27 and 30 degrees from the longitudinal axis of the optical fiber. This transmission may be desirable for some applications where the objective is to extract light from the optical fiber in a narrow cone such as, for example, pavement marking applications.

To inhibit the transmission of light from optically smooth surfaces 20 and 22 of optical element 18, they may be coated with a specularly reflective material such as, for example, an aluminum or silver based composition. Accordingly, light rays which strike optically smooth surfaces 20 and 22 will be specularly reflected.

The entire structured surface 16 of overlay 10 could be coated with a specularly reflective material by conventional processes known in the art such as, for example vapor coating or chemical deposition processes. However, coating the entire structured surface with a specularly reflective material reduces the efficiency of propagation along the light guide because light rays striking a planar portion 24 of structured surface 16 will suffer absorptive losses to the specularly reflective material. Such absorptive losses may be undesirable, especially in situations which require light to be transported across relatively long distances.

To ensure both highly efficient propagation and highly efficient light extraction, it is desirable that planar surface 24 reflect light according to the principles of total internal reflection while optically smooth surfaces 20 and 22 reflect light according to the principles of specular reflection. To achieve this, optically smooth surfaces 20 and 22 may be coated with a specularly reflective material while leaving planar surface 24 untreated by masking or otherwise treating planar surfaces 24 during the manufacturing process.

Accordingly, light incident upon planar surfaces 24 at greater than the critical angle undergoes total internal reflection, while light incident upon optically smooth surfaces 20 and 22 undergoes specular reflection from the specularly reflective coating material.

Figure 3:
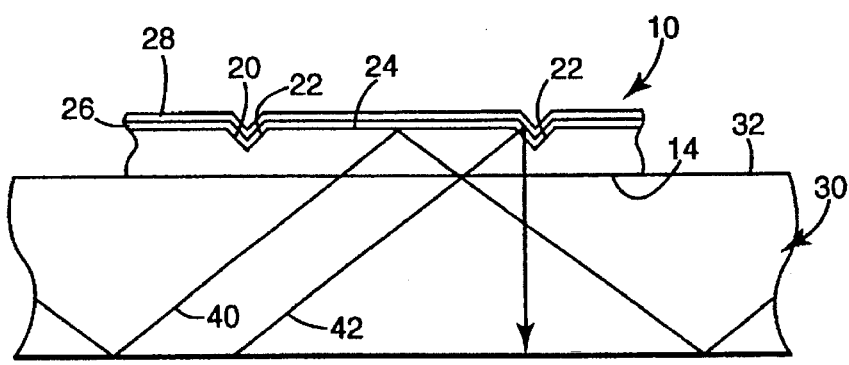
FIG. 3 is a schematic, cross-sectional view of an alternate embodiment of a structured surface light extraction overlay in conjunction with a light guide illustrating its operating principles.

An alternative construction for an overlay in accordance with the present invention which provides for total internal reflection along planar portions of the structured surface and specular reflection from optical elements is schematically depicted in FIG. 3. The structured surface 12 of an overlay 10 in accordance with the present invention is provided with a thin coating layer 26 of a substantially optically transparent material having an index of refraction less than the index of refraction of substrate 12. Fluoropolymers such as, for example, a fluorinated ethylene-propylene based materials have a relatively low refractive index (e.g. 1.34) and are well suited for use as a first coating layer 26. Other suitable materials include polyvinylidene fluoride (refractive index 1.42), perfluoroacrylate (refractive index 1.35) and polytetrafluoroethylene (refractive index 1.40). While the thickness of coating layer 26 is not critical, coating layer 26 should be at least one wavelength thick and preferably measures between approximately 0.25 microns and 10 microns.

A second coating layer 28 preferably comprising a specularly reflective substance such as, for example, silver or aluminum, may be deposited on first coating layer 26 by any conventional method known to the art such as, for example, vapor deposition or sputter coating methods. Again, although the thickness of second coating layer 28 is not critical, second coating layer 28 should be of a thickness sufficient to make the surface substantially opaque. Preferably, second coating layer 28 measures between 0.25 microns and 10 microns in thickness. An optional third coating layer (not shown) may be added to provide a protective seal to inhibit degradation (e.g. oxidation, scratching, wear) of the specularly reflective layer. The third layer may comprise any material suitable to protect the specularly reflective material in the second layer. Fluoropolymers such as, for example, a fluorinated ethylene-propylene based materials are well suited for use as a third coating layer.

Operation of the embodiment depicted in FIG. 3 is illustrated by light rays 40 and 42. Light ray 40 is transmitted from light guide 30 across base surface 14 and strikes a planar portion 24 of structured surface 16. Because the refractive index of the second coating layer is less than the refractive index of substrate 12, light ray 40 it is reflected back into light guide 30 according to the principles of total internal reflection and continues to propagate along light guide 30. By contrast, light ray 42 is transmitted from light guide 30 across base surface 14 and strikes an optically smooth surface 20 of optical element 18 on structured surface 16. Because the incidence angle of light ray 42 exceeds the critical angle for total internal reflection, light ray 42 is transmitted into first coating layer 26, and is specularly reflected from second coating layer 28 back into light guide 30 at an angle which is less than the critical angle required for total internal reflection in light guide 30. Accordingly, light ray 42 is transmitted from the surface of light guide 30 at the location where reflected light ray 42 strikes the surface of light guide 30.

Numerous variations of and modifications to the structures specifically disclosed herein will be obvious to one of ordinary skill in the optical arts. The following of variations and modifications are exemplary and are not intended to be limiting:

(a) The angle of inclination of optically smooth surfaces 20 and 22, relative to base surface 14, may be altered to change the path of reflected light;

(b) The depth of optical elements 18 may be increased or decreased to effect the removal of relatively more or less light, respectively, from light guide 30;

(c) The depth at any given point along optical element 18 may vary (e.g. a constant depth element, a linearly changing depth element, a quadraticly changing depth) to produce optically smooth surfaces having differing shapes;

(d) Overlay 10 may incorporate a plurality of optical elements which differ in at least one of the following characteristics: depth, width, number of optically smooth surfaces, angle of inclination of optically smooth surfaces relative to base surface;

(e) Optically smooth surfaces 20 and 22 may also be curved to provide optical power, or focus, to the reflected light exiting light guide 30;

(f) Optically smooth surfaces 20 and 22 may be separated by a planar surface;

(g) The distance between optical elements, corresponding to the length of the planar portions of the structured surface may be decreased to a minimum of essentially zero millimeters to increase the amount of light extracted by the overlay or may be increased to reduce the amount of light extracted by the overlay;

(h) The distance between optical elements may be constant or may vary, depending upon the application.

Figure 4:
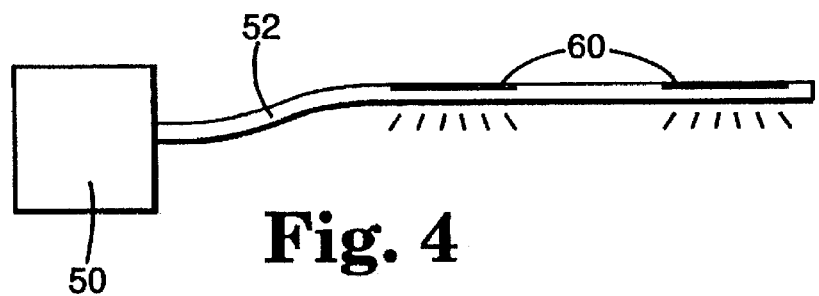
FIG. 4 is a perspective view of an illumination system incorporating a structured surface light extraction overlay in accordance with principles of the present invention.

An illumination system including a light extraction overlay in accordance with the present invention will be explained in greater detail with reference to FIGS. 4–6. FIG. 4 is a schematic depiction of an illumination system including a light source 50 and an optical fiber 52 optically coupled with light source 50. Light source 50 may be any light source suitable for injecting light into optical fiber 52. A commonly used light source is a metal halide lamp or tungsten-halogen lamp. A light extraction overlay 60 in accordance with the present invention is optically coupled with a portion of the length of optical fiber 52 for extracting a portion of the light propagating along optical fiber 52.

Figure 5:
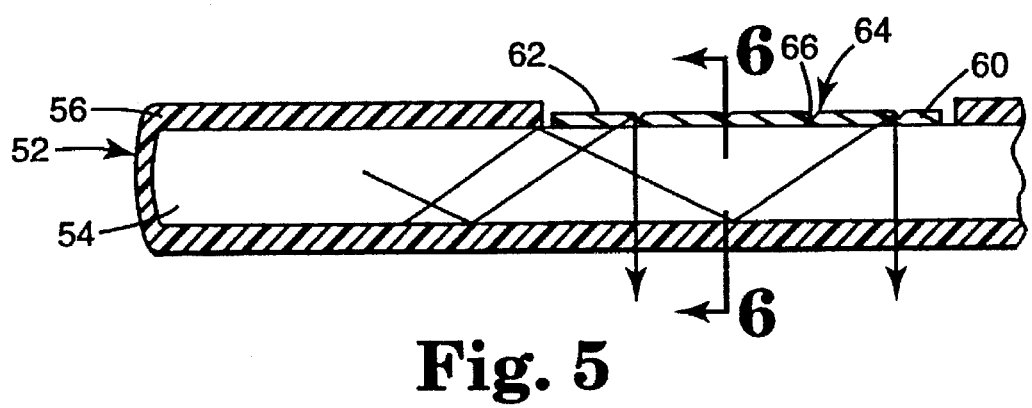
FIG. 5 is a cross-sectional view, taken along the longitudinal axis, of a portion of the optical fiber depicted in FIG. 4.

FIG. 5 presents a cross-sectional view along a longitudinal axis, similar to FIGS. 2 and 3, of light extraction overlay 60 in cooperation with optical fiber 52. FIG. 6 presents a cross-sectional view of overlay 60 and optical fiber 52 through a plane approximately perpendicular to the longitudinal axis of optical fiber 52. Optical fiber 52 includes an optical fiber core 54 formed from an optically transmissive material. Optical fiber core 54 may comprise any suitable optical fiber known to the art, including both inorganic glass and synthetic resin fibers, although core materials having a refractive index of from 1.4 to 1.66 are generally preferred. Common materials include polymethylmethacrylate and polycarbonate. Optical fiber 52 further includes a cladding layer 56 formed from a material having a lower refractive index than the optical fiber core 54. Cladding 56 serves to protect optical fiber core 52 and enables light to be transmitted through optical fiber core 52 according to the principles of total internal reflection. The cladding (where present) may comprise any suitable material known in the art having a refractive index appropriate for the chosen core material. Common materials for optical fiber cladding include polyvinylidene fluoride (refractive index 1.42), perfluoroacrylate (refractive index 1.35) and polytetrafuloroethylene (refractive index 1.40). It will be understood by those of ordinary skill in the optical arts that optical fibers may include additional protective jacketing layers. Additionally, it will be understood by those of ordinary skill in the optical arts that an optical fiber does not require a cladding layer.

The dimensions of the optical fiber may vary depending upon their intended use. For example, for illumination purposes, fiber lengths ranging from 0 to 100 meters are presently commercially useful. Improved optical efficiency would allow for the use of longer optical fibers. For illumination purposes, fibers having a diameter ranging from approximately 1 mm to 25 mm are presently known to be useful. However it will be appreciated that fibers having lesser or greater diameters are contemplated by the present invention. Additionally, while the fiber depicted in FIG. 5 has a circular cross-section, it will be appreciated that optical fibers having varied cross-sectional shapes (e.g. rectangular, square, elliptical) find application in the field of illumination. The present invention is equally applicable to fibers of any cross-sectional shape.

Figure 6:
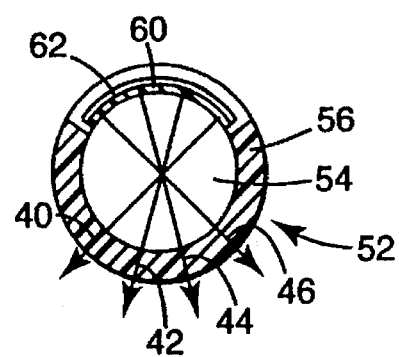
FIG. 6 is a cross-sectional view, taken in a plane perpendicular to the longitudinal axis, of a portion of the optical fiber depicted in FIG. 4.

Referring to FIGS. 5 and 6, a portion of cladding 56 is removed and light extraction overlay 60 is optically coupled with a portion of the surface of optical fiber core 54. Removal of cladding 56 may be accomplished by conventional mechanical or chemical processes. Alternatively, optical fiber 52 may be manufactured with portions of cladding 54 missing at predetermined locations along its length. The base surface of overlay 60 is optically coupled to optical fiber core 52 using conventional chemical or mechanical processes. For example, optically clear adhesives including acrylate transfer adhesives are particularly useful and are commercially available.

In use, light from light source 50 is injected into optical fiber 52 and propagates axially along the length of optical fiber 52 according to the principles of total internal reflection. The refractive index of overlay 60 is at least as great as, and preferably equal to, the refractive index of optical fiber core 52. Accordingly, light rays may be transmitted into overlay 60 and fall incident on structured surface 62 of overlay 60. As discussed above, light rays which strike an optically smooth surface 66 of an optical element 64 are reflected back into optical fiber 52 at an angle which is less than the critical angle necessary for continued propagation along optical fiber 52 and are transmitted from the surface optical fiber 52. FIG. 6 illustrates one manner in which an overlay 60 in cooperation with an optical fiber 52 distributes light across a wide energy pattern. FIG. 6 illustrates the path of four separate light rays, 40, 42, 44, 46 reflected from four separate points on an optically smooth surface 66 of overlay 60. The four separate rays are reflected through the fiber to form an output cone of light which has an angular distribution.

FIG. 6 ignores the effects of refraction upon light rays 40, 42, 44, 46 as they propagate from optical fiber core 54 into cladding 56 and then into the ambient surroundings, presumably air or water. It will be readily appreciated by one of ordinary skill in the optical arts that, for the embodiment depicted in FIG. 6, refraction will tend to narrow the output cone of light exiting optical fiber 52; that is, the surface of optical fiber 52 acts as a lens. Additionally, it will be appreciated that the cross-sectional shape of optical fiber may be changed to alter the optical characteristics of the output cone.

An overlay in accordance with the present invention may be manufactured using conventional manufacturing processes known to one of ordinary skill in the art. For example, a mold which is a negative of the desired structured surface may be manufactured using diamond machining processes to produce an optical finish. The mold may then be used in conventional molding processes to form the structured surface on the optical transparent substrate. Acceptable molding processes include compression molding, injection molding, embossing, or coining. To achieve manufacturing efficiencies, parts may be molded in sheets which are substantially larger than the desired final product and individual overlays may be cut from the sheet using conventional die cutting processes. Additional layers may be deposited on the structured surface of either the sheet or of the individual overlays using conventional processes.

While a preferred embodiment of the present invention and several alternative embodiments have been described so as to enable one skilled in the art to practice the techniques of the present invention, the preceding description is intended to be exemplary and should not be used to limit the scope of the invention. The scope of the invention should be determined only by reference to the following claims.

What is claimed is:

1. A light extraction overlay for use with a light guide, comprising:

a substantially optically transparent substrate having a base surface and a structured surface opposite said base surface, said structured surface comprising a plurality of optical elements defined therein, at least one optical element having a first optically smooth surface disposed at an angle relative to said base surface such that a portion of the light incident on the base surface at an incidence angle $\theta_1$ of said overlay is transmitted through said substrate, reflected from said optically smooth surface and exits said overlay from said base surface at an angle $\theta_2$, which is less than $\theta_1$, said structured surface including a coating layer formed from a material which has a refractive index lower than the refractive index of said overlay.

2. The light extraction overlay of claim 1, wherein:

at least one of said optical elements comprises a optical element extending across a portion of the structured surface of said overlay, said optical element defining a first optically smooth surface disposed at an angle measuring between 10 degrees and 90 degrees relative to said base surface.

3. The light extraction overlay of claim 2, wherein:

said first optically smooth surface is disposed at an angle measuring between 40 and 50 degrees relative to said base surface.

4. The light extraction overlay of claim 3, wherein:

said first optically smooth surface is disposed at an angle of 45 degrees relative to said base surface.

5. The light extraction overlay of claim 2, wherein:

said optical element includes a second optically smooth surface disposed at an angle measuring between 10 degrees and 90 degrees relative to said base surface.

6. The light extraction overlay of claim 5, wherein:

said second optically smooth surface is disposed at an angle measuring between 40 and 50 degrees relative to said base surface.

7. The light extraction overlay of claim 5, wherein:

said second optically smooth surface is disposed at an angle of 45 degrees relative to said base surface.

8. The light extraction overlay of claim 1, wherein:

said structured surface includes at least a second optical element, said second optical element being displaced from said first optical element by a predetermined distance.

9. The light extraction overlay of claim 1, wherein:

said optical elements are coated with a specularly reflective substance.

10. The light extraction overlay of claim 1, further comprising:

a first coating layer covering said structured surface, said first coating layer formed from a material which has a refractive index lower than the refractive index of said overlay; and a second coating layer covering a portion of said first coating layer, said second coating layer formed from a specularly reflective substance.

11. The light extraction overlay of claim 10, further comprising:

a third coating layer formed from a material suitable to protect said specularly reflective substance.

12. The light extraction overlay of claim 1, further comprising:

means for optically coupling said optically smooth base surface to a light guide.

13. A light distribution system, comprising:

a light guide comprising an optical fiber having a length extending along a longitudinal axis of said fiber, a core measuring at least about 1.0 millimeters in width and comprising a substantially optically transparent material and a cladding surrounding said optical fiber core, said cladding formed from a material having a refractive index less than the refractive index of said optical core such that light injected into one end of said optical fiber propagates through said fiber according to the principles of total internal reflection; and at least one light extraction region comprising a light extraction overlay including a substrate having a base surface optically coupled with a portion of a surface of said light guide and a structured surface opposite said base surface, said structured surface comprising a plurality of optical elements, at least one optical element having a first optically smooth surface disposed at an angle relative to said base surface such that light propagating through said light guide may be transmitted into said overlay through the base surface of said overlay, reflected from said optically smooth surface and transmitted from a surface of said light guide at a location displaced from said overlay.

14. The light distribution system of claim 13, wherein:

said light guide comprises an optical fiber having a length extending along a longitudinal axis of said fiber.

15. The light distribution system of claim 13, wherein:

said base surface of said light extraction overlay is optically coupled with a portion of the surface of said optical fiber core along a predetermined length of said optical fiber.

* * * * *